United States Patent
Zhao et al.

(10) Patent No.: US 9,092,541 B2
(45) Date of Patent: Jul. 28, 2015

(54) ROUTE CONFIGURATION IMPLEMENTATION METHOD AND ROUTING DEVICE

(75) Inventors: Yang Zhao, Beijing (CN); Keke Liu, Beijingi (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 622 days.

(21) Appl. No.: 13/530,424

(22) Filed: Jun. 22, 2012

(65) Prior Publication Data

US 2012/0266062 A1    Oct. 18, 2012

Related U.S. Application Data

(63) Continuation of application No. PCT/CN2010/080129, filed on Dec. 22, 2010.

(30) Foreign Application Priority Data

Dec. 24, 2009    (CN) .......................... 2009 1 0261691

(51) Int. Cl.
| | |
|---|---|
| *G06F 17/22* | (2006.01) |
| *G06F 17/30* | (2006.01) |
| *H04L 12/24* | (2006.01) |
| *H04L 29/08* | (2006.01) |
| *G06F 17/21* | (2006.01) |
| *H04L 12/701* | (2013.01) |

(Continued)

(52) U.S. Cl.
CPC .......... *G06F 17/30899* (2013.01); *H04L 41/08* (2013.01); *H04L 41/22* (2013.01); *H04L 67/04* (2013.01); *H04L 67/303* (2013.01); *H04L 45/00* (2013.01)

(58) Field of Classification Search
CPC ......................................................... G06F 17/00
USPC ................................................... 715/234, 238
See application file for complete search history.

(56) References Cited

U.S. PATENT DOCUMENTS

| | | | |
|---|---|---|---|
| 6,973,619 B1 | 12/2005 | Hirose et al. | |
| 7,689,644 B2 * | 3/2010 | Teruyuki et al. | ............... 709/201 |

(Continued)

FOREIGN PATENT DOCUMENTS

| | | |
|---|---|---|
| CN | 1338688 A | 3/2002 |
| CN | 1477544 A | 2/2004 |

(Continued)

OTHER PUBLICATIONS

Office Action issued in corresponding Chinese Patent Application No. 200910261691.X, mailed Feb. 16, 2011.

(Continued)

*Primary Examiner* — James J Debrow
(74) *Attorney, Agent, or Firm* — Brinks Gilson & Lione

(57) ABSTRACT

The embodiments of the present invention relate to the field of communication technologies and disclose a route configuration implementation method and a routing device, The route configuration implementation method includes: when it has been detected that an address entered in a browser is a locally configured address, analyzing a type of a display connected to a routing device; and if the display is a display of a first type, providing a pre-stored simplified page for the browser for displaying, where the pre-stored simplified page includes a route configuration page, and a page of the browser is displayed through the display and the simplified page is smaller than a regular page to match the screen of the display of the first type, where the resolution of the screen of the display of the first type is lower than that of a regular screen.

15 Claims, 3 Drawing Sheets

(56) References Cited

U.S. PATENT DOCUMENTS

| | | |
|---|---|---|
| 2002/0087630 A1 | 7/2002 | Wu |
| 2002/0198974 A1 | 12/2002 | Shafer |
| 2005/0193053 A1 | 9/2005 | Kendall et al. |
| 2006/0274869 A1 | 12/2006 | Morse |
| 2010/0268825 A1* | 10/2010 | Jeong et al. .................. 709/226 |

FOREIGN PATENT DOCUMENTS

| | | |
|---|---|---|
| CN | 1477596 A | 2/2004 |
| CN | 1666193 A | 9/2005 |
| CN | 101770333 A | 7/2010 |
| JP | 2000-82039 A | 3/2000 |
| JP | 2003101546 A | 4/2003 |

OTHER PUBLICATIONS

International Search Report and Written Opinion of the International Searching Authority issued in corresponding PCT Patent Application No. PCT/CN2010/080129, mailed Mar. 31, 2011.

Extended European Search Report issued in corresponding European Patent Application No. 10838685.5, mailed Oct. 25, 2012.

* cited by examiner

ROUTE CONFIGURATION IMPLEMENTATION METHOD AND ROUTING DEVICE

CROSS-REFERENCE TO RELATED APPLICATIONS

This application is a continuation of International Application No. PCT/CN2010/080129, filed on Dec. 22, 2010, which claims priority to Chinese Patent Application No. 200910261691.X, filed on Dec. 24, 2009, both of which are hereby incorporated by reference in their entireties.

FIELD OF THE INVENTION

The present invention relates to the field of communication technologies, and in particular, to a route configuration implementation method and a routing device.

BACKGROUND OF THE INVENTION

At present, in a process of network configuration, a method of web management is generally used as a router configuration manner, that is, to perform route configuration through a browser. After a user terminal establishes an Ethernet connection or a wifi (Wireless Fidelity, wireless fidelity) connection, a special IP address may be entered through the user terminal, so that a route configuration page is turned to.

In the prior art, the most common route configuration is implemented through a PC (Personal Computer, personal computer). Specifically, after a physical connection (such as over an Ethernet or a wireless local area network) is established between a PC and a router, a fixed private network address, such as 192.168.1.1, is entered in the address bar of the browser through the PC and then, a page shown in FIG. 1 or a similar parameter configuration page would appear in the browser for the user to configure routing parameters. Normal display of the above page generally requires that the resolution of the display of the PC should be at least 800×600. It can be seen in FIG. 1 that, such type of parameter configuration page can display more content and involve many parameter items with a neat page format.

With the development of the 3G (the 3rd Generation, 3rd generation communication) technologies, a battery-powered portable 3G router emerges. Such 3G router may work with a variety of handheld wifi devices, for example, a mobile phone with a wifi function, a PSP (Play Station Portable, a new multi-functional portable play station developed by Sony), and iTouch (a flash memory MP4 player launched by Apple). Definitely, when the handheld wifi device establishes a wifi connection through the 3G router, route configuration is also needed.

During the implementation of the route configuration, the inventor finds that the prior art has at least the following problems:

Although many handheld wifi devices support a browser, because the LCD (Liquid Crystal Display, liquid crystal display) of a handheld wifi device is usually small, many parameter configuration pages that can be normally displayed on a PC will be crowded on the wifi handheld device, which makes it difficult for a user to view the pages and makes route configuration inconvenient for the user.

SUMMARY OF THE INVENTION

Embodiments of the present invention provide a route configuration implementation method and a routing device, which are used to provide a proper parameter configuration page for a small-screen terminal to complete route configuration so as to improve user experience.

For the above purpose, embodiments of the present invention adopt the following technical solution:

A route configuration implementation method includes:
when it has been detected that an address entered in a browser is a locally configured address, analyzing a type of a display connected to a routing device; and
if the display is a display of a first type, providing a pre-stored simplified page for the browser for displaying, where the pre-stored simplified page includes a route configuration page;
where, a page of the browser is displayed through the display and the simplified page is smaller than a regular page to match a screen of the display of a first type, where the resolution of the screen of the display of a first type is lower than that of a regular screen.

A routing device includes:
a detecting module, configured to detect whether an address entered in a browser is a locally configured address;
an analyzing module, configured to analyze a type of a display connected to the routing device, when the detecting module detects that the address entered in the browser is a locally configured address; and
a simplifying module, configured to, when the analyzing module finds through analysis that the display is a display of a first type, provide a pre-stored simplified page for the browser for displaying. where the pre-stored simplified page includes a route configuration page, and a page of the browser is displayed through the display and the simplified page is smaller than a regular page to match a screen of the display of a first type, where the resolution of the screen of the display of a first type is lower than that of a regular screen.

According to the route configuration implementation method and routing device provided by the embodiments of the present invention, with respect to a certain routing device, if it is judged that the display connected to the routing device is a display of a first type, when route configuration is performed through the display, the routing device provides a set of simplified pages for the display of a first type to be adapted to the display of a first type so as to complete the route configuration process. Because the size of a simplified page is smaller than that of a regular page, the simplified page is more adaptable to a display of a first type of which the resolution is lower than that of a regular screen. In comparison with the prior art, the visual effect may be enhanced and the user experience may be improved.

BRIEF DESCRIPTION OF THE DRAWINGS

To illustrate the technical solution in the embodiments of the present invention or the prior art more clearly, the accompanying drawings required in the description of the embodiments of the present invention or the prior art are briefly introduced in the following. Apparently, the accompanying drawings illustrate only some embodiments of the present invention and persons of ordinary skill in the art can derive other drawings from these drawings without creative efforts.

DETAILED DESCRIPTION OF THE EMBODIMENTS

The technical solution of the embodiments of the present invention is hereinafter described clearly and completely with reference to the accompanying drawings. Apparently, the embodiments herein are only a part rather than all of the embodiments of the present invention. Based on the embodiments herein, persons of ordinary skill in the art can derive other embodiments without creative efforts and such other embodiments all fall within the protection scope of the present invention.

The route configuration implementation method and the routing device provided by the embodiments of the present invention are described in detail with reference to the accompanying drawings.

Embodiment 1

Figure 2:
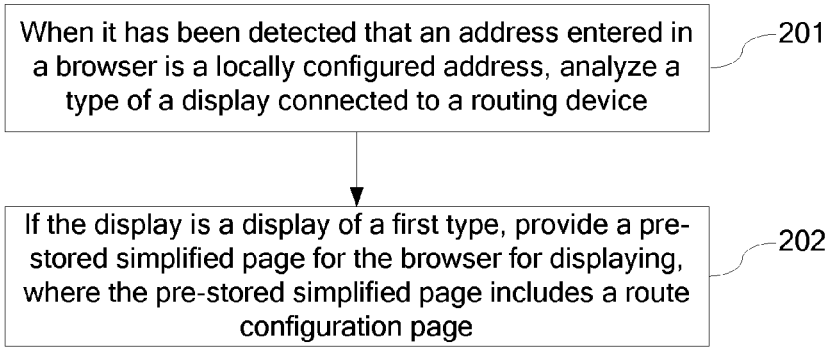
FIG. 2 is a flowchart of a route configuration implementation method according to Embodiment 1 of the present invention.

As shown in FIG. 2, a route configuration implementation method provided by the embodiment includes:

201. When it has been detected that an address entered in a browser is a locally configured address, analyze a type of a display connected to the routing device, where a page of the browser needs to be displayed through the display.

In the embodiment, displays are categorized into a display of a first type and a display of a second type according to their screen resolutions or screen sizes, where, in terms of the screen size or screen resolution, the display of a first type is smaller than the display of a second type. In the description of embodiments hereinafter, the display of a first type is described as a small-screen display and the display of a second type is described as a large-screen display.

Because a display used in daily life is usually a display of a second type, the screen of a large-screen display may be called a large screen or regular screen.

Generally, if a user enters an address 192.168.1.1 or 192.168.0.1 in the address bar of the browser, it indicates that the current user is to perform route configuration. Then, the routing device needs to analyze the type of the display connected to the routing device to judge whether the screen of the display is a large screen or small screen.

For different routing devices, the sizes of provided parameter configuration pages are different and different routing device providers have different definitions about large screen and small screen. In the embodiment, the type of a display can be judged in the following two manners:

(1) Obtain the screen resolution of the display currently connected to the routing device; if the screen resolution is lower than a preset resolution, the display is a small-screen display; otherwise, the display is a large-screen display.

The preset resolution may be but is not limited to 480×320 pixels; and in practical applications, the preset resolutions defined for different routing devices are deferent.

(2) Obtain hardware platform information of the display currently connected to the routing device; compare the hardware platform information with a pre-stored small-screen display information set; if the hardware platform information belongs to the pre-stored small-screen display information set, the display is a small-screen display; otherwise the display is a large-screen display.

The information included in the pre-stored small-screen display information set may be but is not limited to the model of the device to which the display belongs. For example, if the routing device detects that the display currently connected to the routing device belongs to a mobile phone with a wifi function (for example, Nokia E55) and information of this mobile phone is recorded in the small-screen display information set pre-stored by the routing device, it may be judged that the display currently connected to the routing device is a small-screen display.

With the development of technologies, there will be more and more small-screen displays or terminals on which the small-screen displays rely; if the information thereof is all recorded in a routing device, a large space is occupied and the comparison takes a long time.

Therefore, in the embodiment, the first manner is adopted preferably to judge the type of the display currently connected to the routing device.

202. If the display is a small-screen display, provide a pre-stored simplified page for the browser for displaying, where the pre-stored simplified page includes a route configuration page, and the simplified page is smaller than a regular page so as to match the screen of a display with a resolution lower than that of a regular screen. The regular screen here is a screen applicable to a large-screen display.

If the display currently connected to the routing device is a small-screen display, for example, a LCD screen of a hand-held terminal such as a mobile phone, a PSP, or an iTouch, the routing device provides a set of simplified pages for displaying in the browser, for a user to perform route configuration.

On the other side, if the display currently connected to the routing device is a large-screen display, for example, a display of a PC, the routing device provides a set of regular pages for displaying in the browser, for the user to perform route configuration.

To better adapt the simplified page to the small-screen display, the simplified page is not only smaller than a regular page in terms of size, but also includes less content than a regular page; for example, advanced function settings such as firewall settings will not appear on a simplified page.

The executor of the above steps may be any routing device and in particular, a routing device supporting a 3G function.

Figures 3, 4:
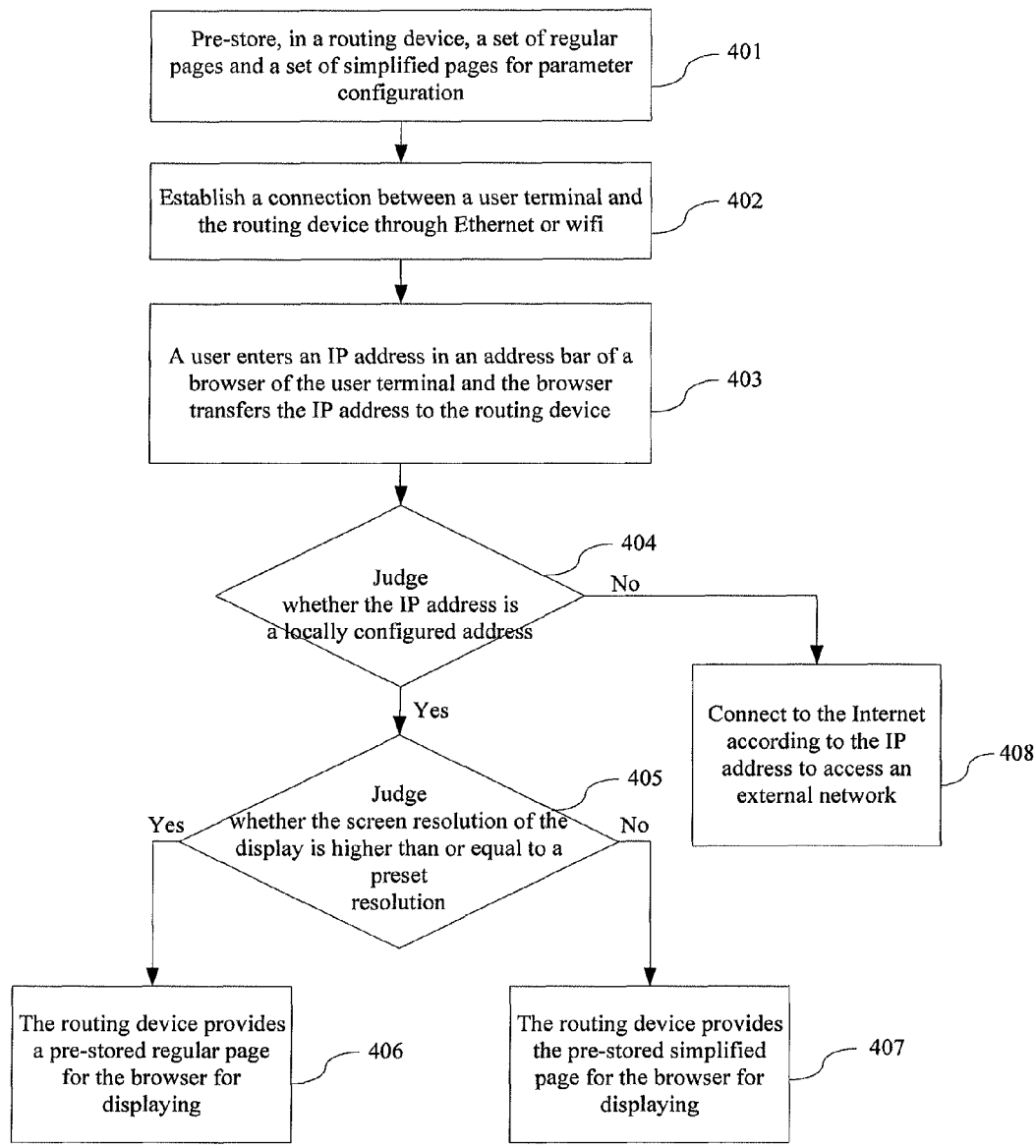
FIG. 3 is a schematic structural diagram of a routing device according to Embodiment 1 of the present invention.
FIG. 4 is a flowchart of a route configuration implementation method according to Embodiment 2 of the present invention.

Corresponding to the route configuration implementation method, the embodiment also provides a routing device for implementing the method. As shown in FIG. 3, the routing device includes:

a detecting module 31, configured to detect whether an address entered in a browser is a locally configured address;

an analyzing module 32, configured to analyze a type of a display connected to the routing device, when the detecting module 31 detects that the address entered in the browser is a locally configured address; and a simplifying module 33, configured to, when the analyzing module 32 finds through analysis that the display is a small-screen display, provide a pre-stored simplified page for the browser for displaying, where the pre-stored simplified page includes a route configuration page.

A page of the browser is displayed through the display and the simplified page is smaller than a regular page to match the screen of a display with a resolution lower than that of a regular screen. The regular screen here is a screen applicable to a large-screen display.

According to the route configuration implementation method and routing device provided by the embodiment, with respect to a certain routing device, if it is judged that the display connected to the routing device is a small-screen display, when route configuration is performed through the small-screen display, the routing device provides a set of simplified pages for the small-screen display to complete the route configuration process. Because the size of a simplified page is smaller than that of a regular page, the simplified page is more adaptable to a small-screen display, which may improve the visual effect and enhance the user experience.

Embodiment 2

The route configuration implementation method provided by the embodiment of the present invention is further described through a complete embodiment. In the embodiment, a type of a display is distinguished preferably in a manner of presetting resolution.

As shown in FIG. 4, the route configuration implementation method provided by the embodiment specifically includes the following steps:

401. Pre-store, in a routing device, a set of regular pages and a set of simplified pages for parameter configuration.

The routing device may be a conventional router or a 3G router.

The regular pages are web pages applied in a conventional route configuration process, and in addition to the basic route configuration page, include some advanced configuration pages such as a firewall parameter configuration page.

The simplified pages may display less content, where a configuration page corresponding to an advanced function such as a firewall function is not included and only a basic function configuration page such as a route configuration page is reserved.

402. Establish a connection between a user terminal and the routing device through Ethernet, wifi, or a USB (Universal Serial Bus, universal serial bus).

The user terminal should support a browser function and may be a PC or a handheld device such as a mobile phone with a wifi function, a PSP, or an iTouch.

403. A user enters an IP (Internet Protocol, Internet Protocol) address in an address bar of a browser presented on the display of the user terminal and the browser transfers the IP address to the routing device through HTTP (Hypertext Transfer Protocol, Hypertext Transfer Protocol).

404. After receiving the IP address, the routing device parses the IP address and judges whether the IP address is a locally configured address.

If the result of the judgment is that the IP address is a locally configured address, step 405 is performed; and if the result of the judgment is that the IP address is not a locally configured address, step 408 is performed.

405. When the IP address entered in the browser is a locally configured address, the routing device analyzes the screen resolution of the currently connected display and judges whether the screen resolution of the display is higher than or equal to a preset resolution.

In the embodiment, the preset resolution is 480×320 pixels, but definitely the preset resolution may also be set according to the different objects served by different routing devices. If the screen resolution of the display is higher than or equal to 480×320 pixels, step 406 is performed; and if the screen resolution of the display is lower than 480×320 pixels, step 407 is performed.

406. The routing device provides a pre-stored regular page for the browser for displaying.

Specifically, the routing device provides the browser with parameters which correspond to the regular page. The parameters include information such as a web page icon displayed by a web page, an image and a text and their display position information, a position and pattern of a web page button, and a parameter item that needs to be configured. After obtaining the information, the browser parses the information and displays, in the browser, a web page obtained by parsing, so that the user performs parameter configuration according to the content displayed on the page.

407. The routing device provides a pre-stored simplified page for the browser for displaying.

Specifically, the routing device provides the browser with parameters corresponding to the simplified page; and after obtaining the corresponding parameters, the browser parses the parameters and displays, in the browser, a web page obtained by parsing, so that the user performs parameter configuration according to the content displayed on the page.

It can be known from the foregoing description that, a simplified page includes less content than a regular page and excludes content of advanced function configuration while reserving only basic configurations used most frequently by the user, for example, a route configuration page. In addition, the simplified page may further include a combination of one or more items of the following basic function configurations: PIN (personal identification number, personal identification number) verification page, traffic measurement page, short message page, and wifi password modification page.

Meanwhile, to make the simplified page better match a small-screen display (with a resolution lower than 600×800 pixels), in the parameters corresponding to the simplified page provided by the routing device for the browser, a size of an element such as an icon and a text and a format and layout of content to be displayed are all adjusted in order to improve the visual effect of the small-screen display.

Figure 1:
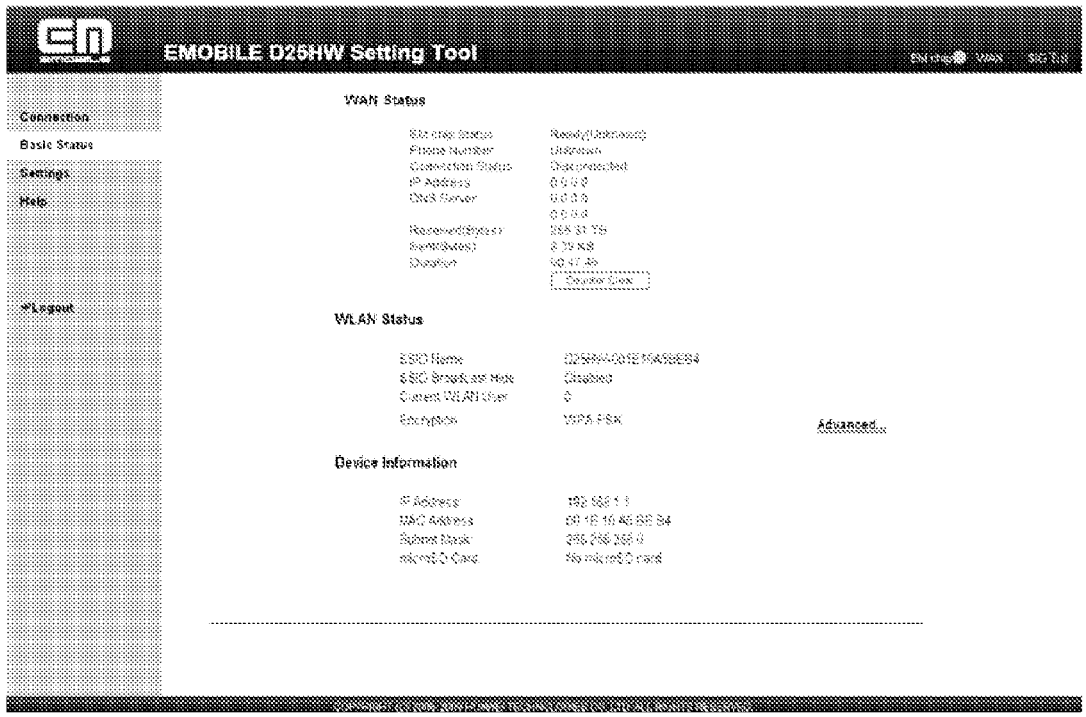
FIG. 1 is a regular page for route configuration in a prior art.
Figure 5:
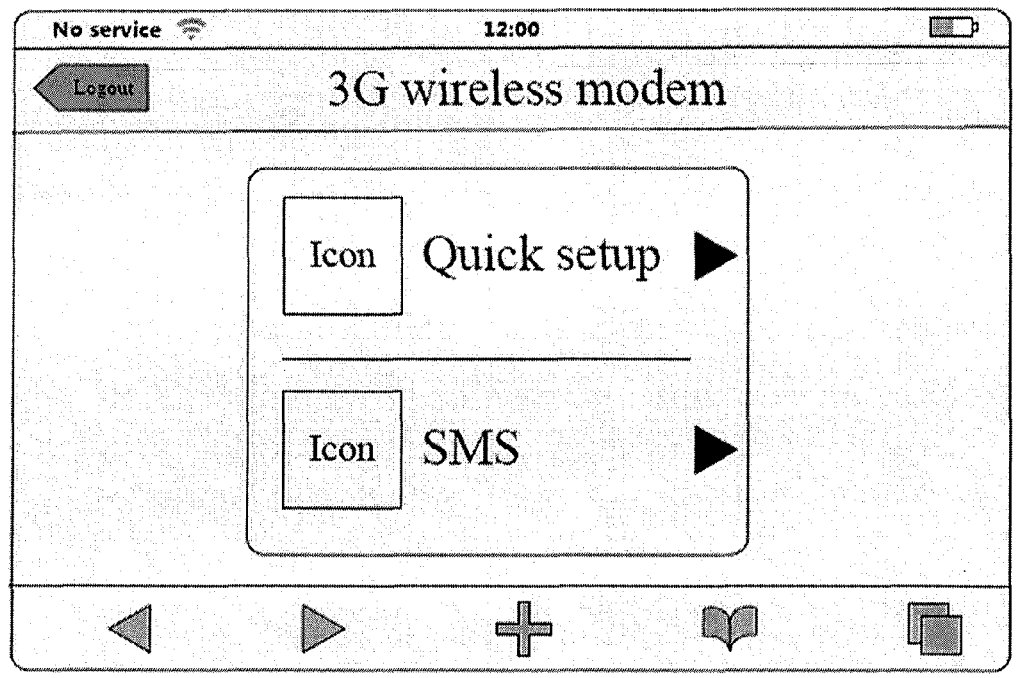
FIG. 5 is an example of a simplified page provided by the method according Embodiment 2 of the present invention.

FIG. 5 is an example of a simplified page provided by the routing device in the embodiment. Compared with the regular page shown in FIG. 1, the simplified home page includes much fewer icons and texts and reserves only link buttons corresponding to two functions of quick setup (quick setup) and short message service (SMS). The content to be displayed and the layout are simplified. On the simplified home page, a corresponding route configuration page or SMS function page may be invoked by clicking different buttons. The page shown in FIG. 5 is a simple example. On the simplified home page, buttons corresponding to functions such as PIN verification and traffic measurement may be set for invoking pages corresponding to different functions.

408. When the IP address entered in the browser is a non-locally configured address, connect to the Internet according to the IP address to access an external network.

The sequence numbers of the foregoing steps are not used to limit the sequence of their execution.

Further, after saving of the regular page and simplified page is completed in the routing device, it is not necessary to perform step 401 every time when route configuration is performed. That is, in subsequent route configuration processes, only steps 402 to 408 need to be performed and the regular page or simplified page that are pre-stored in step 401 may be read directly.

In the route configuration implementation method provided by the embodiment, with respect to a same routing device, when it is determined that a user is to perform route configuration, the screen resolution of the display currently connected to the routing device is first analyzed and then a suitable page is provided for the display adaptively according to the screen size of the display. That is, if the screen of the display is a large screen, the regular page is provided for the display; otherwise, the simplified page is provided for the display. In this way, whatever screen the user faces, a basic function such as route configuration may be completed through a neat and orderly web page. For a handheld terminal with a small-screen, especially, the method provided by the embodiment may improve the visual effect of web displaying and enhance the user experience.

Embodiment 3

According to the route configuration implementation method provided by Embodiment 2 of the present invention, this embodiment provides a routing device.

Figure 6:
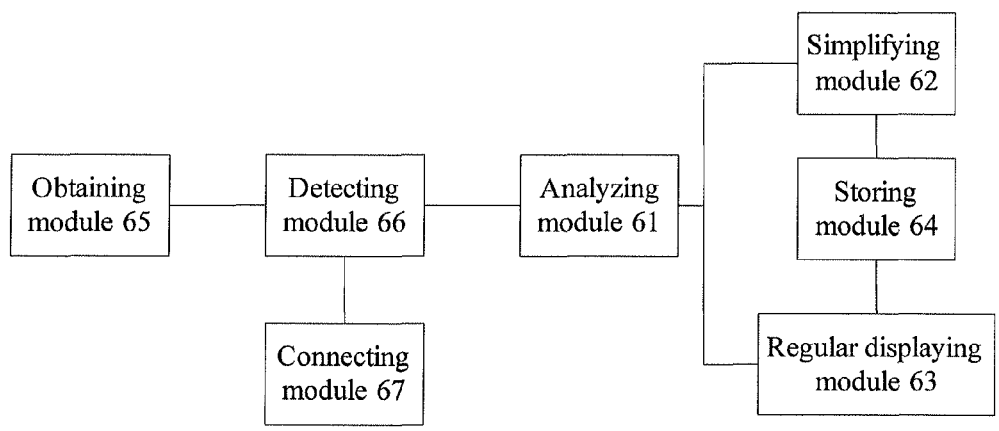
FIG. 6 is a schematic structural diagram of a routing device according to Embodiment 3 of the present invention.

As shown in FIG. 6, the routing device in the embodiment includes an analyzing module 61, a simplifying module 62, and a regular displaying module 63, and a storing module 64, an obtaining module 65, a detecting module 66, and a connecting module 67.

The storing module 64 saves a set of regular pages and a set of simplified pages, where both the regular pages and the simplified pages include a route configuration page respectively, and the simplified pages display less content than the regular pages.

The obtaining module 65 obtains information of an address entered in a browser and the detecting module 66 judges whether the entered address is a locally configured address. If the entered address is a locally configured address, the address is sent to the analyzing module 61 for analyzing a type of a display connected to the routing device; if the entered address is a non-locally configured address, the connecting module 67 connects to the Internet directly to access an external network.

If a result of the analysis of the analyzing module 61 is that the currently connected display is a large-screen display, the regular displaying module 63 provides a regular page for the browser for displaying, where the regular page is pre-stored in the storing module 64; if the result of the analysis of the analyzing module 61 is that the currently connected display is a small-screen display, the simplifying module 62 provides a simplified page for the browser for displaying, where the simplified page is pre-stored in the storing module 64; the simplified page is smaller than the regular page to match a display screen with a resolution lower than that of a regular screen.

The specific working principle of the analyzing module 61 is as follows:

The analyzing module 61 is configured to obtain the screen resolution of the display currently connected to the routing device; if the screen resolution is lower than a preset resolution (which may be but is not limited to 480×320 pixels), the display is a small-screen display; otherwise, the display is a large-screen display.

Alternatively, the analyzing module 61 is configured to obtain hardware platform information of the display currently connected to the routing device and compare the hardware platform information with a pre-stored small-screen display information set; if the hardware platform information belongs to the pre-stored small-screen display information set, the display is a small-screen display; otherwise, the display is a large-screen display.

The routing device provided in the embodiment, when it is determined that a user is to perform route configuration, first analyzes the type of the display currently connected to the routing device and then provides the display with a suitable page adaptively according to the screen size of the display. That is, if the screen of the display is a large screen, the routing device provides the regular page for the display, and otherwise provides the simplified page for the display. In this way, whatever screen the user faces, a basic function such as route configuration may be completed through a neat and orderly web page. For a small-screen handheld terminal, especially, the routing device provided by the embodiment may improve the visual effect of web displaying and enhance the user experience.

The solution provided by the embodiments of the present invention provides a good configuration approach for the routing device, especially a portable 3G router. Because a 3G router is usually used cooperatively with a wifi handheld device (such as a mobile phone, PSP, and iTouch) and such wifi handheld device have a small LCD screen, it is very inconvenient to use cooperatively with a conventional web display. With the solution provided in the embodiments of the present invention, the routing device may provide proper web pages for different terminals automatically according to the screen size, which achieves automatic adaptation according to the display styles of different LCDs, and brings great convenience to the user.

Through the foregoing description of the embodiments of the present invention, those skilled in the art can understand that the present invention can be implemented by hardware only or by software plus a necessary universal hardware platform. Based on such understanding, the technical solution of the present invention that contributes to the prior art may be embodied, in part or in whole, in the form of a software product. The software product may be stored in a readable storage medium, such as a ROM/RAM, a magnetic disk, or an optical disk, and include a number of instructions that enable a computer device (such as a personal computer, a server, or a network device) to execute the method in the embodiments or certain portions of the embodiments of the present invention.

Detailed above are only exemplary embodiments of the present invention, but the protection scope of the invention is not limited thereto. Any modification or replacement readily conceivable by those skilled in the art within the technical scope disclosed in the present invention shall be included in the protection scope of the present invention. Therefore, the protection scope of the present invention is subject to the appended claims.

What is claimed is:

1. A route configuration implementation method, comprising:
   when it has been detected that an address entered in a browser is a locally configured address, analyzing a type of a display connected to a routing device; and
   if the display is a display of a first type, providing a pre-stored simplified page for the browser for displaying, wherein the pre-stored simplified page comprises a route configuration page, and
   a page of the browser is displayed through the display and the simplified page is smaller than a regular page to match a screen of the display of the first type, wherein the resolution of the screen of the display of the first type is lower than that of a regular screen.

2. The route configuration implementation method according to claim 1, further comprising:
if the display is a display of a second type, providing a pre-stored regular page for the browser for displaying.

3. The route configuration implementation method according to claim 1, wherein the analyzing the type of the display connected to the routing device comprises:
obtaining a screen resolution of the display connected to the routing device, wherein, if the screen resolution is lower than a preset resolution, the display is the display of the first type, and otherwise, the display is a display of a second type;
or,
obtaining hardware platform information of the display connected to the routing device and comparing the hardware platform information with a pre-stored small-screen display information set, wherein, if the hardware platform information belongs to the pre-stored small-screen display information set, the display is the display of the first type, and otherwise, the display is a display of a second type.

4. The route configuration implementation method according to claim 2, wherein the analyzing the type of the display connected to the routing device comprises:
obtaining a screen resolution of the display connected to the routing device, wherein, if the screen resolution is lower than a preset resolution, the display is the display of the first type, and otherwise, the display is a display of a second type;
or,
obtaining hardware platform information of the display connected to the routing device and comparing the hardware platform information with a pre-stored small-screen display information set, wherein, if the hardware platform information belongs to the pre-stored small-screen display information set, the display is the display of the first type, and otherwise, the display is a display of a second type.

5. The route configuration implementation method according to claim 3, wherein the preset resolution is 480×320 pixels.

6. The route configuration implementation method according to claim 4, wherein the preset resolution is 480×320 pixels.

7. The route configuration implementation method according to claim 1, wherein, before the analyzing the type of the display connected to the routing device, the method further comprises:
saving the regular page and the simplified page, wherein both the regular page and the simplified page comprise a route configuration page, and the simplified page displays less content than the regular page.

8. The route configuration implementation method according to claim 2, wherein, before the analyzing the type of the display connected to the routing device, the method further comprises:
saving the regular page and the simplified page, wherein both the regular page and the simplified page comprise a route configuration page, and the simplified page displays less content than the regular page.

9. The route configuration implementation method according to claim 1, wherein the simplified page further comprises a combination of one or more items: PIN verification page, traffic measurement page, short message page, and wifi password modification page.

10. A routing device, comprising:
a detector, configured to detect whether an address entered in a browser is a locally configured address;
an analyzer, configured to analyze a type of a display connected to the routing device, when the detecting module detects that the address entered in the browser is a locally configured address; and
a simplifying module, configured to, when the analyzing module finds through analysis that the display is a display of a first type, provide a pre-stored simplified page for the browser for displaying, wherein the pre-stored simplified page comprises a route configuration page, and
a page of the browser is displayed through the display and the simplified page is smaller than a regular page to match a screen of the display of the first type, wherein the resolution of the screen of the display of the first type is lower than that of a regular screen.

11. The routing device according to claim 10, further comprising:
a regular displaying module, configured to provide a pre-stored regular page for the browser for displaying, when the analyzing module finds through analysis that the display is a display of a second type.

12. The routing device according to claim 10, wherein:
the analyzer is configured to obtain a screen resolution of the display connected to the routing device, wherein, if the screen resolution is below a preset resolution, the display is the display of the first type, and otherwise, the display is a display of a second type;
or,
the analyzer is configured to obtain hardware platform information of the display connected to the routing device and compare the hardware platform information with a pre-stored small-screen display information set, wherein, if the hardware platform information belongs to the pre-stored small-screen display information set, the display is the display of the first type, and otherwise, the display is a display of a second type.

13. The routing device according to claim 11, wherein:
the analyzer is configured to obtain a screen resolution of the display connected to the routing device, wherein, if the screen resolution is below a preset resolution, the display is the display of the first type, and otherwise, the display is a display of a second type;
or,
the analyzer is configured to obtain hardware platform information of the display connected to the routing device and compare the hardware platform information with a pre-stored small-screen display information set, wherein, if the hardware platform information belongs to the pre-stored small-screen display information set, the display is the display of the first type, and otherwise, the display is a display of a second type.

14. The routing device according to claim 10, further comprising:
a storage, configured to save the regular page and the simplified page, wherein the regular page and the simplified page both comprise a route configuration page, and the simplified page displays less content than the regular page.

15. The routing device according to claim 11, further comprising:
a storage, configured to save the regular page and the simplified page, wherein the regular page and the simplified page both comprise a route configuration page, and the simplified page displays less content than the regular page.

* * * * *

UNITED STATES PATENT AND TRADEMARK OFFICE
CERTIFICATE OF CORRECTION

PATENT NO. : 9,092,541 B2  
APPLICATION NO. : 13/530424  
DATED : July 28, 2015  
INVENTOR(S) : Yang Zhao et al.

Page 1 of 1

It is certified that error appears in the above-identified patent and that said Letters Patent is hereby corrected as shown below:

On the Title Page

Left column, item (75), after "Keke Liu," replace "Beijingi" with --Beijing--.

Signed and Sealed this  
Second Day of February, 2016

Michelle K. Lee  
*Director of the United States Patent and Trademark Office*